United States Patent [19]
Dalrymple et al.

[11] Patent Number: 5,944,106
[45] Date of Patent: Aug. 31, 1999

[54] WELL TREATING FLUIDS AND METHODS

[75] Inventors: Eldon D. Dalrymple, Duncan, Okla.;
Jeff A. Dahl, Noordwijk, Netherlands;
Stephen T. Arrington, Duncan, Okla.;
Prentice G. Creel, Midland, Tex.

[73] Assignee: Halliburton Energy Services, Inc., Duncan, Okla.

[21] Appl. No.: 08/907,235

[22] Filed: Aug. 6, 1997

[51] Int. Cl.$^6$ .................. E21B 43/267; E21B 33/138
[52] U.S. Cl. .................. 166/281; 166/295; 166/300; 166/308; 507/211; 507/222; 507/922; 523/130
[58] Field of Search .................. 166/280, 281, 166/294, 295, 300, 308; 507/211, 215, 216, 217, 222, 922, 924; 523/130

[56] References Cited

U.S. PATENT DOCUMENTS

| | | | |
|---|---|---|---|
| 3,172,470 | 3/1965 | Huitt et al. | 166/281 |
| 3,172,471 | 3/1965 | Warren | 166/281 |
| 3,198,253 | 8/1965 | Holbert | 166/281 |
| 3,483,121 | 12/1969 | Jordan | 166/308 |
| 4,460,627 | 7/1984 | Weaver et al. | |
| 4,532,052 | 7/1985 | Weaver et al. | 166/294 X |
| 5,080,170 | 1/1992 | Whitebay et al. | 166/281 |
| 5,425,421 | 6/1995 | Coleman et al. | 166/294 X |
| 5,445,223 | 8/1995 | Nelson et al. | 166/308 |
| 5,558,161 | 9/1996 | Vitthal et al. | 166/280 |
| 5,791,415 | 8/1998 | Nguyen et al. | 166/280 |
| 5,840,784 | 11/1998 | Funkhouser et al. | 166/295 X |

*Primary Examiner*—George Suchfield
*Attorney, Agent, or Firm*—Robert A. Kent

[57] ABSTRACT

The present invention provides a method for reducing the amount of water produced from a subterranean formation as a result of stimulation of the subterranean formation. The method comprises the introduction of a gelled fluid to initiate a fracture in a formation, introduction of a first and second reactive polymer which leak-off into the formation along the fracture and which are capable of subsequently reacting together to form a reaction product which selectively reduces the permeability of the formation to water flow through the formation into the fracture and introduction of a crosslinked gelled fluid to extend the fracture into the formation and facilitate the introduction of a propping agent into the created fracture. The reactive polymers react in situ to form a reaction product that binds to the formation in such a manner that the flow of water is selectively retarded through the matrix while the flow of oil is substantially unaffected.

20 Claims, No Drawings

WELL TREATING FLUIDS AND METHODS

BACKGROUND OF THE INVENTION

1. Field of the Invention

The present invention relates to an improved method for effecting water control during treating of subterranean zones in wells utilizing aqueous well treating fluids.

2. Description of the Prior Art

High viscosity aqueous crosslinked gels are used in a variety of operations and treatments carried out in subterranean zones or formations including, but not limited to, production stimulation treatments.

An example of a production stimulation treatment utilizing a high viscosity crosslinked gelled fluid is hydraulic fracturing. In hydraulic fracturing treatments, the high viscosity fluid is utilized as a fracturing fluid and also carries particulate propping agent, such as, sand, into the fractures formed. That is, the fracturing fluid is pumped through the wellbore into a formation to be stimulated at a rate and pressure such that fractures are formed and extended in the formation. Propping agent is suspended in the fracturing fluid so that it is deposited in the fractures when the gel is broken and returned to the surface. The propping agent functions to prevent the formed fractures from closing whereby conductive channels are formed through which produced fluids can flow to the wellbore.

Borate ion has long been used as a crosslinking agent for forming high viscosity crosslinked gelled well treating fluids. Various sources of borate ion have been utilized including boric acid, borax, sodium tetraborate and proprietary compositions comprised of boric acid and dimers and trimers of borate ions. Additionally, titanium, zirconium, aluminum, antimony ions and the like have been used as crosslinking agents to form high viscosity crosslinked gelled fluids.

A problem that often occurs during the performance of a stimulation treatment in an oil or gas producing zone which contains high permeability streaks which produce water or is subject to water influx is stimulation of the water producing zones concurrently with stimulation of the oil production. In such instances, water production from the formation may be excessive, requiring expensive separation and water disposal. Alternatively, after a stimulation treatment has been performed, a water control treatment may be attempted to reduce the production of water. The remedial treatments are expensive and are not always successful. The treatments can result in plugging of the formation and loss of production.

It would be desirable to provide a means by which a formation may be treated to selectively reduce the permeability of a subterranean formation to water flow while not damaging the ability of oil to flow through the formation to the producing well.

SUMMARY OF THE INVENTION

The present invention provides improved methods for reducing water production during stimulation treatments employing crosslinked gelled aqueous well treating fluids.

The stimulation treatment is initiated by the introduction of a gelled fluid into the wellbore at a rate and pressure sufficient to fracture the formation. The gelled fluid is basically comprised of water, a hydrated galactomannan gelling agent, a first reactive polymer and a second reactive polymer capable of reacting in situ with said first reactive polymer to form a polycationic branched polymer and a pH adjusting agent capable of providing a pH in excess of about 9 to the fluid containing the reactive polymers. The gelled fluid then is followed with a crosslinked gelled fluid to extend the created fractures into the subterranean formation and transport proppant into the fractures. In one preferred embodiment, the crosslinked gelled fluid is basically comprised of water, a hydrated galactomannan gelling agent and a borate composition comprised of water, a boron source and an alkanolamine or alkylamine. The galactomannan gelling agent is present in the aqueous treating fluid in an amount in the range of from about 0.06% to about 0.72% by weight of water therein. The borate crosslinking composition is present in the crosslinked treating fluid in an amount in the range of from about 0.1% to about 0.8% by weight of water therein.

A borate crosslinking composition useful in accordance with the present invention is comprised of water in an amount in the range of from about 5% to about 96% by weight of the composition, boron (as boric acid) in an amount in the range of from about 3% to about 82% by weight of the composition and an alkanolamine or alkylamine present in an amount in the range of from about 1% to about 13% by weight of the composition. The alkanolamine is preferably an ethanolamine, most preferably monoethanolamine.

The methods of using the improved well treating fluids of this invention are basically comprised of the steps of preparing such treating fluids and then pumping the treating fluids into a subterranean zone or formation penetrated by a wellbore. The well then is shut-in for a sufficient period of time to permit the in situ polymerization to occur.

The shut-in time may vary from as little as several hours to over 24 hours. Preferably the wellbore is shut-in for at least about six hours and most preferably about 12 to 18 hours.

It is, therefore, a general object of the present invention to provide improved methods for reducing water production during stimulation treatments of subterranean formations.

Other and further objects, features and advantages of the present invention will be readily apparent to those skilled in the art upon a reading of the description of preferred embodiments which follows.

DESCRIPTION OF PREFERRED EMBODIMENTS

The gelled aqueous well treating fluids of the present invention are simple to prepare and utilize the pH levels of the preferably borate crosslinked gels to facilitate the formation of the in situ reaction product in the initially introduced fluid. Both the gelled treatment fluid and the crosslinked gelled treatment fluid are comprised of water and a hydrated galactomannan gelling agent along with selected other constituents.

The water utilized to form the well treating fluids of this invention can be fresh water, salt water, sea water, brine or any other aqueous liquid which does not adversely react with other components of the treating fluid. The water used in well treating fluids normally contains one or more salts for inhibiting the swelling of clays in the subterranean formations or zones being treated or to weight the treating fluid. The most common clay inhibiting salt utilized is potassium chloride, but other salts can also be used. The pH of the water is preferably in the range of from about 6.0 to about 8.5 to facilitate the hydration of the galactomannan gelling agent utilized.

The galactomannan gelling agents which can be used in accordance with the present invention are the naturally occurring gums and their derivatives such as guar, locust bean, tara, honey locust, tamarind, karaya, tragacanth, carrageenan and the like. These gums are generally characterized as containing a linear backbone consisting of mannose units having various amounts of galactose units attached thereto. The gums can also be characterized as having one or more functional groups such as cis-hydroxyl, hydroxyl, carboxyl, sulfate, sulfonate, amino or amide. Of the various galactomannan gelling agents which can be utilized, one or more gelling agents selected from the group of guar, hydroxyethylguar, hydroxypropylguar, carboxymethylguar, carboxymethylhydroxyethylguar and carboxymethylhydroxypropylguar are preferred. Of these, guar is the most preferred.

When one or more of the above mentioned glactomannan gelling agents are dissolved in water, the gelling agents are hydrated and a viscous aqueous gel is formed. In accordance with this invention, the galactomannan gelling agent or agents utilized are dissolved in the water in an amount in the range of from about 0.06% to about 0.72% by weight of the water, more preferably in an amount in the range of from about 0.12% to about 0.36%, most preferably about 0.30%.

The first reactive polymer comprises an alkyl acrylate polymer of the general formula:

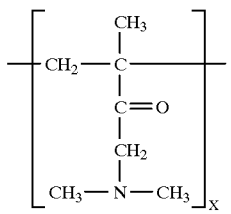

which is reacted in situ with a polyethylene oxide chain $(OCH_2CH_2)_n$ that can be capped or terminated by hydrogen, hydroxyl, $C_1$–$C_6$ oxyalkyl, $C_6$–$C_8$ oxyaryl, oxy (2 hydroxy-3-chloropropane) or Oxy (−2,3−oxypropane) and the like. Preferably, the polyethylene oxide chain is reacted with epichlorohydrin. The reaction of the two reactive polymers yields compounds of the general formula:

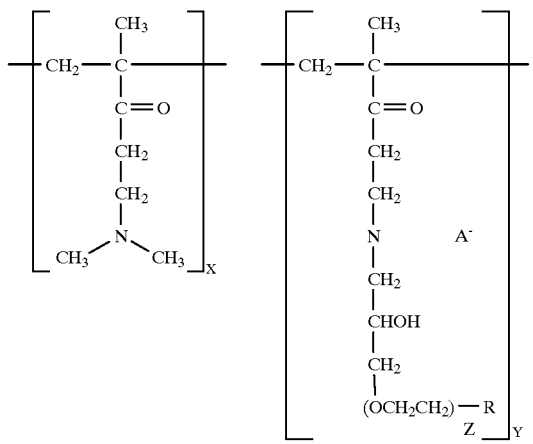

with X being from about 10 to 15,000; Y being from about 1 to 5,000 and Z being from about 2 to 10,000 and $A^-$ is an anion associated with the quaternary nitrogen, such as chlorine when an epichlorohydrin adduct is utilized. The ethylene oxide chain is capped with methyoxy for purposes of the illustration.

In one preferred embodiment, the first reactive polymer is admixed with the gelled treatment fluid in an amount of from about ½ to about 10 percent by weight of the treatment fluid. The second reactive polymer comprising the polyethylene oxide compound is admixed with the gelled treatment fluid in an amount of from about ½ to about 10 percent by weight of the treatment fluid. The admixture then is pumped into the wellbore and into the subterranean formation wherein it reacts in the rock matrix over time to form a branched polymer that tends to bond itself to the matrix as a result of its cationic nature.

The in situ reaction generally is effected at a formation temperature in excess of 75° F. and preferably in excess of about 100° F. The pH of the treatment fluid is adjusted to a level of above about 9 to facilitate rapid formation of the polycationic branched polymer by the addition of an alkaline agent such as caustic or the like.

Preferably the pH is adjusted to a level above about 9.5 and most preferably about 11–12.

The gelled treatment fluid is followed by a crosslinked gelled treatment fluid to extend fractures into the subterranean formation from the wellbore. The gelled fluid is displaced by the crosslinked gelled treatment fluid into the created fractures whereupon the reactive polymers leak off into the matrix of the formation and the in situ polymerization reaction is effected.

In an alternative embodiment, the first and second reactive polymers may be introduced into the subterranean formation following the introduction of a quantity of the gelled fluid. In this instance a quantity of the gelled fluid is introduced into the formation and the first and second reactive polymers are introduced as a separate stage in an aqueous fluid. The aqueous fluid typically will include a quantity of a clay control additive such as potassium chloride or tetramethylammonium chloride or the like and a pH adjusting agent such as caustic or the like to raise the pH to a level of above about 9 and most preferably to 11–12. The reactive polymers then may be followed with an additional quantity of the gelled fluid to displace the reactive polymers into the formation or by the crosslinked gelled fluid. If an additional quantity of the gelled fluid is utilized, it then is followed with the crosslinked gelled fluid.

The water and gelling agents of the crosslinked gelled fluid may be any of those previously described. Preferably the crosslinking agent comprises a borate composition which provides buffering to the treating fluid as well as crosslinking the hydrated galactomannan gelling agent in the treating fluid. Preferably the borate crosslinking composition is a liquid solution generally comprised of water, a soluble boron source such as boric acid and an alkanolamine or alkylamine. The water utilized in forming the borate composition is preferably fresh water, but other aqueous liquids can be utilized so long as they do not adversely react with or otherwise affect other components of the borate composition or the treating fluid formed therewith. The water can include one or more freezing point depressants such as ethylene glycol, propylene glycol, alcohols or the like to prevent the borate composition from freezing in cold weather. Preferably, ethylene glycol is combined with the water used in an amount of 50% by weight of the resulting solution which depresses the freezing point of the borate composition to less than about −20° F. The term "water" when used hereinbelow relating to the borate composition means water or other suitable aqueous liquid with or without one or more freezing point depressants dissolved therein. The water is preferably present in the borate composition in an amount in the range of from about 96% to about 5% by weight of the composition, most preferably about 60%.

The boron source can comprise substantially any boron containing compound capable of yielding borate in a solution maintained at a pH above about 7. The boron source can be provided by, for example, boric acid, boric oxide, pyroboric acid, metaboric acid, borax, sodium tetraborate and the like. For simplicity, reference will hereinafter be made to borate or boron content as boric acid or boric acid equivalents. That is, if a weight percentage is specified for boron content as boric acid, it is to be understood that a chemical equivalent amount of, for example, borax or sodium tetraborate could be substituted for the boric acid.

The boron source is preferably present in the crosslinking composition in an amount as boric acid in the range of from about 3% to about 82% by weight of the composition, most preferably in an amount of about 30%.

A variety of alkanolamines or alkylamines can be utilized in the borate crosslinking composition, but the quantity of boron in the composition is reduced as the molecular weight of the amine included in the composition increases. Thus, it is preferred that a relatively low molecular weight alkanolamine be used such as an ethanolamine. The most preferred low molecular weight alkanolamine is mono-ethanolamine. The use of a low molecular weight alkanolamine in the borate composition produces the further benefit of making the composition cold weather stable, i.e., the composition without a freezing point depressant therein does not crystallize or the like at low temperatures down to about 5° F. Other suitable alkanolamines include diethanolamine, 1-amino-2-propanol, 1-amino-2-butanol and the like. The alkylamines can comprise an aliphatic polyamine such as, for example, ethylenediamine, diethylenetriamine, triethylenetetraamine, 1,2-diaminopropane, tetraethylenepentamine and the like. The alkanolamine or alkylamine is generally present in the crosslinking and buffering composition in an amount in the range of from about 1% to about 13% by weight of the composition. When mono-ethanolamine is utilized, it is preferably present in the composition in an amount of about 10% by weight of the composition.

A particularly preferred highly concentrated, stable crosslinking composition useful in accordance with this invention is comprised of water present in an amount of about 60% by weight of the composition, boron calculated as boric acid present in an amount of about 30% by weight of the composition and mono-ethanolamine present in an amount of about 10% by weight of the composition. This composition is stable and is easily pumped and metered at low temperatures. The borate ion concentration in the composition is very high, and the composition has the ability to buffer the resulting treating fluid to a pH between about 8.4 and 9 without the need for any other chemicals such as caustic, sodium carbonate or other buffer.

The crosslinking composition comprised of water, a boron source and alkanolamine or alkylamine is present in the borate crosslinked gelled aqueous well treating fluids of this invention in an amount in the range of from about 0.05% to about 0.8% by weight of water in the treating fluids, preferably in an amount in the range of from about 0.15% to about 0.4%.

A particularly preferred borate crosslinked gelled aqueous well treating fluid of this invention is comprised of water, hydrated guar present in an amount of about 0.30% by weight of the water and the preferred borate composition for buffering the treating fluid and crosslinking the hydrated guar comprised of water, boric acid and mono-ethanolamine described above present in the treating fluid in an amount of about 0.2% by weight of the water.

As will be well understood by those skilled in the art, a variety of conventional additives can be included in the well treating fluids of this invention such as gel stabilizers, gel breakers, clay stabilizers, bactericides, fluid loss additives and the like which do not adversely react with the treating fluids or prevent their use in a desired manner.

The improved methods of the present invention for treating a subterranean zone penetrated by a wellbore are basically comprised of the steps of preparing a gelled aqueous treating fluid containing a first and second reactive polymer and a crosslinked gelled aqueous treatment fluid and pumping the fluids into the subterranean formation. The wellbore then is shut-in for a period of at least several hours to permit the in situ reaction to occur. Preferably the wellbore is shut-in for at least about 6 hours and most preferably from about 12 to 18 hours. In such treatments, the gelled well treating fluids are pumped through the wellbore into the subterranean zone or formation to be fractured at a high rate and pressure whereby fractures are formed in the subterranean zone or formation and a propping agent, such as sand is suspended in the crosslinked treating fluid and carried into the fractures and deposited therein. Thereafter, during the shut-in period the gelled and crosslinked fluids are caused to break, i.e., revert to a thin fluid which can be reverse flowed out of the fractures leaving the proppant therein. Production of hydrocarbons then may be initiated from the treated subterranean formations.

In order to further illustrate the compositions and methods of the present invention, the following examples are provided.

EXAMPLE I

A stimulation treatment was performed using a treating fluid of the present invention. The treated formation was a sandstone formation having a permeability of from 4–6 md at a depth of about 7500 to 7700 feet. The wellbore was perforated over 8 feet at 4 shots per foot at a depth of about 7570 feet. The bottom hole static temperature was about 135° F. The treatment was effected at a rate of about 10 barrels per minute at about 2000 psi. The treatment comprised: 5000 gal of a gelled preflush comprising 25 lbs guar/1000 gal of fluid; 8000 gal of 2% KCl solution containing 5% by weight reactive polymers of the present invention, 1 gal/1000 gal of surfactant, 5 gal/1000 gal of 25% by weight caustic solution; 4000 gal of a gelled fluid comprising 25 lbs guar/1000 gal of fluid and 26000 gal of a borate crosslinked gelled fluid comprising 25 lbs guar/1000 gal of fluid. The gelled fluids also included 2% by weight KCl, 0.3 lbs/1000 gal of a bactericide, 1 gal/1000 gal of a surfactant, 5 gal/1000 gal of a 25% by weight caustic solution and 1 lb/1000 gal of a breaker. The crosslinked fluid included a total of about 120000 lbs of sand as a proppant in a ramped injection of from 2 to 8 lbs per gal. At the conclusion of the treatment the well was shut in for 48 hours to permit the reactive polymers to polymerize after which it was flowed back and placed on production. After 2 months the well is producing an average of about 125 barrels of oil per day with a water to oil ratio of about 30%. Offset wells without the treatment of the present invention are producing from about 30 to about 60 percent as much oil and have a water to oil ratio of from about 60 to 65%.

Thus, the present invention is well adapted to carry out the objects and attain the benefits and advantages mentioned as well as those which are inherent therein.

EXAMPLE II

The following laboratory flow studies were performed to evaluate the process of the present invention.

Sandstone core samples approximately 10 cm long and 2.38 cm in diameter were sealed into a sleeve having a fluid entry and exit port on opposite ends of the sleeve. A solution of Standard API Brine comprising 9% sodium chloride and 1% calcium chloride by weight is flowed through the cell at a flow rate of 2 to 5 ml/min with a back-pressure of about 100 psi until a relative initial water permeability is established.

Kerosene then is flowed through the core to establish an initial oil permeability. This sequence generally will be repeated three times to establish an average initial permeability. The core then is treated with a quantity of the first and second reactive polymers in a pH adjusted aqueous fluid. After the polymers have been permitted to react, brine and oil permeabilities are again determined by flowing either Standard API Brine or kerosene through the core until a constant permeability is established.

The results of the tests and the concentration of the reactive polymers, solution pH and relative change in permeability for the oil and water flows are set forth below in Table I.

TABLE I

| Sample No. | Temperature | pH | Concentration Reactive Polymers ½, WT. % | Retained Water | Permeability, % Oil |
|---|---|---|---|---|---|
| 1 | 140 | 12 | 2.5/2.5 | 83 | 192 |
| 2 | 140 | 12 | 2.5/2.5 | 78 | 233 |
| 3 | 140 | 12 | 5/5 | 40 | 100 |
| 4 | 110 | 9 | 6.25/6.25 | 31 | 84 |
| 5 | 200 | 12 | 5/5 | 31 | 58 |
| 6 | 214 | 11.5 | 5/5 | 6 | 27 |

The test results demonstrate the ability of the reactive polymers to selectively reduce core permeability to water flow while not preventing oil flow through the various core samples.

While numerous changes to the compositions and methods can be made by those skilled in the art, such changes are encompassed within the spirit of this invention as defined by the appended claims.

What is claimed is:

1. A method of reducing formation water production upon stimulation of a subterranean formation comprising:
   introducing a gelled fluid comprising a hydrated galactomannan gelling agent and water into a subterranean formation at a rate and pressure sufficient to create at least one fracture in said formation;
   introducing a solution of a first reactive polymer and a second reactive polymer capable of polymerizing with said first reactive polymer into said fracture in said formation and into the matrix of said formation;
   introducing a crosslinked gelled fluid comprising a crosslinked hydrated galactomannan gelling agent and water into said created fracture to extend said fracture in said formation;
   introducing a quantity of a propping agent into said created fracture by addition to a quantity of said crosslinked gelled fluid; and
   shutting-in said well for a sufficient period of time to permit the first and second reactive polymers to polymerize in said formation whereby said reaction product selectively reduces the permeability of said subterranean formation to water.

2. The method of claim 1 wherein said solution of reactive polymers has a pH of at least about 9 by the addition of a pH adjusting agent.

3. The method of claim 1 wherein said well is shut-in for at least about 6 hours.

4. The method of claim 1 wherein said subterranean formation has a temperature above about 75° F.

5. The method of claim 1 where said first reactive polymer is an alkyl acrylate and said second reactive polymer is a polyethylene oxide chain.

6. The method of claim 1 wherein the polymerization yields compounds of the general formula:

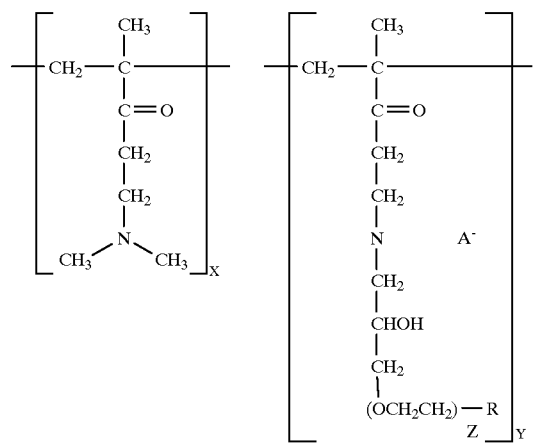

wherein X is from about 10 to 15,000, Y is from about 1 to 5,000, Z is from about 2 to 10,000, $A^-$ is an anion associated with the quaternary nitrogen and R is hydrogen, hydroxyl, $C_1$–$C_6$ oxyalkyl, $C_6$–$C_8$ oxyaryl, oxy (2 hydroxy-3-chloropropane) or oxy (-2,3-oxypropane).

7. The method of claim 6 wherein R is $-OCH_3$

8. The method of claim 1 wherein said gelled fluid and said first and second reactive polymers are introduced substantially simultaneously.

9. The method of claim 1 wherein said first and second reactive polymer is introduced into said formation in admixture with at least a portion of said gelled fluid.

10. A method of reducing formation water production upon the stimulation of an oil-bearing subterranean formation penetrated by a wellbore comprising:
   introducing a gelled fluid comprising a hydrated gelling agent and an aqueous fluid through said wellbore at a rate and pressure sufficient to create at least a fracture in said formation;
   introducing a solution of a first reactive polymer comprising an alkyl acrylate and a second reactive polymer comprising a capped polyethylene oxide into said wellbore under conditions whereby said reactive polymers leak-off into the formation matrix along said created fracture;
   introducing a crosslinked gelled fluid comprising a crosslinked hydrated gelling agent and an aqueous fluid through said wellbore at a rate and pressure sufficient to extend said fracture in said formation;
   introducing a quantity of a propping agent into said created fracture by admixture of said propping agent with at least a portion of said crosslinked gelled fluid introduced into said formation; and
   shutting-in said well for a sufficient period of time whereby at least a portion of said first and second reactive polymers polymerize in situ such that said polymerized reaction product selectively reduces the permeability of said subterranean formation to water.

11. The method of claim 10 wherein said solution of reactive polymers has a pH of at least about 9.

12. The method of claim 10 wherein said solution of reactive polymers has a pH of at least about 11.

13. The method of claim 10 wherein said subterranean formation has a temperature above about 100° F.

14. The method of claim 10 wherein the polymerization yields compounds of the general formula:

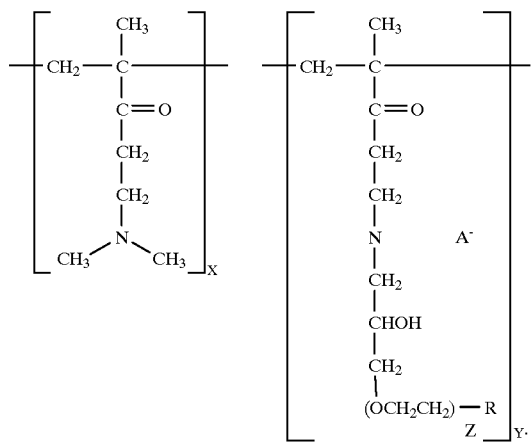

15. The method of claim 14 wherein R is —OCH$_3$

16. The method of claim 10 wherein said gelled fluid and said first and second reactive polymers are introduced substantially simultaneously.

17. The method of claim 10 wherein said first and second reactive polymer is introduced into said formation in admixture with at least a portion of said gelled fluid.

18. The method of claim 10 wherein said hydrated gelling agent is selected from the group consisting of guar, hydroxyethyl guar, hydroxypropyl guar, carboxymethyl guar, carboxymethylhydroxyethyl guar, carboxymethydroxy-propyl guar and mixtures thereof.

19. The method of claim 10 wherein said crosslinked gelled fluid is formed by the addition of a crosslinking agent to the gelled fluid selected from the group consisting of a source of borate ions, titanium ions, zirconium ions, aluminum ions, antimony ions and mixtures thereof.

20. A method of reducing the production of formation water upon stimulation of a hydrocarbon-bearing subterranean formation penetrated by wellbore comprising:

introducing a gelled fluid comprising a hydrated gelling agent and an aqueous fluid into said formation through said wellbore at a rate and pressure sufficient to create at least one fracture in said formation;

introducing a first reactive polymer comprising an epichlorohydrin adduct of methoxy capped polyethylene oxide together with an a second reactive polymer comprising an alkyl acrylate into said formation and permitting at least a portion of said polymers to leak-off into the formation matrix;

introducing a quantity of a crosslinked gelled fluid comprising a quantity of the gelled fluid first introduced to which a crosslinking agent now is added to effect crosslinking into said created fracture to extend said fracture in said formation;

shutting-in said wellbore whereby said first reactive polymer and said second reactive polymer are permitted to react in situ within said formation to form a reaction product that selectively reduces the permeability of said formation to water flow therethrough; and producing hydrocarbons from said formation.

* * * * *